(12) United States Patent
Li et al.

(10) Patent No.: US 7,453,893 B2
(45) Date of Patent: Nov. 18, 2008

(54) METHODS AND APPARATUS FOR GENERATING SESSION DETAIL RECORDS

(75) Inventors: San-qi Li, Plano, TX (US); Weijun Lee, Plano, TX (US); David Lu, Coppell, TX (US)

(73) Assignee: Santera Systems, LLC, Plano, TX (US)

( * ) Notice: Subject to any disclaimer, the term of this patent is extended or adjusted under 35 U.S.C. 154(b) by 622 days.

(21) Appl. No.: 11/109,337

(22) Filed: Apr. 19, 2005

(65) Prior Publication Data

US 2006/0062208 A1    Mar. 23, 2006

Related U.S. Application Data

(60) Provisional application No. 60/611,221, filed on Sep. 18, 2004.

(51) Int. Cl.
*H04L 12/28* (2006.01)

(52) U.S. Cl. .................. 370/401; 370/352; 370/392; 711/113

(58) Field of Classification Search ........................ None
See application file for complete search history.

(56) References Cited

U.S. PATENT DOCUMENTS

| | | | |
|---|---|---|---|
| 7,221,660 B1 * | 5/2007 | Simonson et al. | ........... 370/312 |
| 2003/0212809 A1 * | 11/2003 | Wu et al. | ................... 709/231 |
| 2004/0047290 A1 * | 3/2004 | Komandur et al. | .......... 370/230 |

* cited by examiner

*Primary Examiner*—Duc C Ho
(74) *Attorney, Agent, or Firm*—Jenkins, Wilson, Taylor & Hunt, P.A.

(57) ABSTRACT

An apparatus including a plurality of packet processors each included in one of a plurality of voice-over-internet-protocol (VoIP) network interfaces. Each of the plurality of packet processors is configured to cache a latest version of realtime transport control protocol (RTCP) report data by discarding an older version of the RTCP report data. The RTCP report data includes at least one of RTCP sender report data and RTCP receiver report data. The apparatus also includes a packet data switching matrix configured to switch packet data between ones of the plurality of VoIP network interfaces. A central processor of the apparatus is configured to generate a final session detail record upon the termination of a VoIP-session by selecting RTCP session-concluding report data from a plurality of RTCP final report data each cached by a corresponding one of the plurality of packet processors.

20 Claims, 3 Drawing Sheets

METHODS AND APPARATUS FOR GENERATING SESSION DETAIL RECORDS

CROSS-REFERENCE TO RELATED APPLICATIONS

This application claims the benefit of U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 18, 2004, the entirety of which is hereby incorporated herein.

BACKGROUND

Voice-over-Internet-Protocol (VoIP) is used in IP telephony to send voice information in digital form in discrete packets rather than in the traditional circuit-committed protocols of the public switched telephone network (PSTN). In addition to IP, VoIP uses realtime transport protocol (RTP) to help ensure that packets get delivered in a timely manner. RTP combines its data transport with a realtime transport control protocol (RTCP) to, for example, monitor data delivery. Such monitoring allows the receiver to detect if there is any packet loss and to compensate for any delay jitter.

RTP works independently of underlying transport and network layer protocols. Information in the RTP header tells the receiver how to reconstruct the data and describes how the codec bit streams are packetized. RTP components include a sequence number used to detect lost packets, payload identification to describe media encoding, frame indication to mark the beginning and end of each frame, source identification to identify the originator of the frame, and intramedia synchronization to detect and compensate for different delay jitter within a single stream.

VoIP session detail records (SDRs) are required by telecom service providers to ensure service level agreements. With wide deployment of VoIP networks and increasing volume of VoIP-to-VoIP calls, especially transcoding-free VoIP-to-VoIP sessions, all telecom carriers will find it critical to efficiently generate VoIP session detail records.

The session detail record of a VoIP session may be generated by measuring the received RTP packets. This approach requires intensive computation by hardware resources and is cost-inefficient.

For transcoding-free VoIP-to-VoIP calls, the session detail record of a VoIP session may also be efficiently derived from the RTCP packets in the session, which contain session identification data (e.g., payload types, total packets sent, total packets received) and Quality of Service (QoS) metrics (e.g., packet loss, jitter, and round trip time).

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
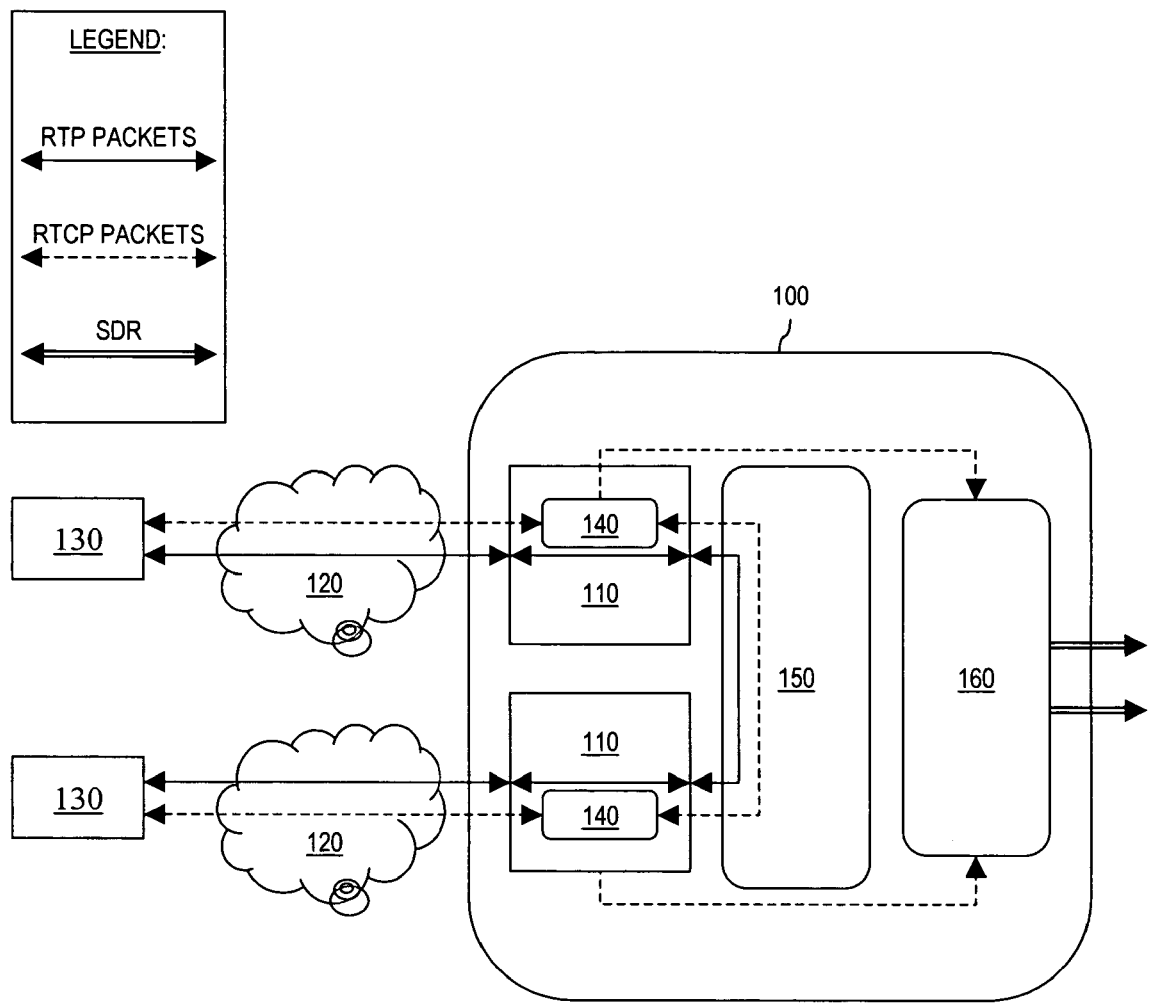
FIG. 1 is a schematic view of at least a portion of one embodiment of apparatus according to aspects of the present disclosure.

The following is at least a partial list of the acronyms that appear in the present disclosure. Those skilled in the art will readily recognize that the terms corresponding to each of the acronyms listed below may vary within the art, within the embodiments explicitly described herein, and within other embodiments within the scope of the present disclosure. Those skilled in the art will also understand that aspects of the present disclosure are not limited to applications pertaining specifically to any one or more of the following acronyms. Acronyms not listed below but otherwise mentioned or discussed herein should be recognized and understood by those skilled in the pertinent art within the context of the present disclosure. In the event that an acronym is employed in the present disclosure in a manner inconsistent with its usage in the art, the scope of the present disclosure is intended to include both the ordinary usage in the art and the specific usage herein.

| Acronym | Term |
| --- | --- |
| 2G | second generation wireless technology |
| 3G | third generation wireless technology |
| 3GPP | third generation partnership project |
| 3GPP2 | third generation partnership project 2 |
| AAL | ATM adaptation layer |
| AAL2 | AAL Type 2 |
| AMR | adaptive multi-rate |
| ATM | asynchronous transfer mode |
| CALEA | Communications Assistance to Law Enforcement Act |
| CDMA | code-division-multiple-access |
| CDMA2000 | also known as IMT-CDMA Multi-Carrier or 1xRTT, is a code-division multiple access (CDMA) version of the IMT-2000 standard developed by the International Telecommunication Union (ITU) |
| CDR | call detail record |
| DSL | digital subscriber line |
| DSP | digital signal processor |
| GPRS | general packet radio service |
| HDLC | high-level data link control |
| IP | Internet Protocol |
| Iu | interface between the RNS and the core network |
| IuCS | circuit switched interface between 3G RNC and 3G MSC |
| IuPS | packet switched interface between 3G RNC and 3G SGSN |
| IuFP | Iu framing protocol |
| Iu UP | Iu interface user plane |
| MEGACO | media gateway control; control protocol between MG and MGC |
| MG | media gateway |
| MGC | media gateway controller |
| MSC | mobile switching center |
| MSM | multi-service module |
| Nb | interface between media gateways |
| NP-NI | non-packet network interface |
| NP-SM | non-packet switching matrix |
| PCM | pulse code modulation |
| PI | packet interface (e.g., packet network interface) |
| P-NI | packet network interface |
| POTS | plain old telephone service |
| P-SM | packet switching matrix |
| PSTN | public switched telephone network |
| QoS | quality of service |
| RAN | radio access network |
| RNC | radio network controller |
| RNS | radio network station |
| RR | receiver report |
| RTCP | realtime transport control protocol, or control protocol related to RTP |
| RTP | realtime transport protocol |

-continued

| Acronym | Term |
| --- | --- |
| SAP | service access point |
| SAR | segmentation and reassembly |
| SDR | session detail record |
| SR | sender report |
| SS7 | Signaling System 7 |
| TDM | time-division multiplexing |
| TFO | tandem free operation |
| TrFO | transcoder free operation |
| UMTS | universal-mobile-telecommunications-service |
| VoDSL | voice over DSL; e.g., voice delivered using DSL |
| VoIP | voice over IP; e.g., voice delivered using the Internet Protocol |
| VoP | voice over packet; e.g., voice delivered using packets |
| W-CDMA | Wideband Code-Division Multiple Access |
| WMG | media gateway which, in addition to wireless capabilities, may include wired or wireline switching, services, and/or other wired or wireline capabilities |

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Accumulativeness is a key characteristic of RTCP reports during a VoIP session. For example, the total number of lost packets is accumulatively reported by the latest RTCP Sender Report (SR) and/or Receiver Report (RR) packet. Accumulativeness is also applicable to other metrics of the VoIP session, including other QoS metrics such as total number of received packets, total number of sent packets, etc. Consequently, the percentage of packet loss, among other potentially key QoS metrics for a VoIP session, may be derived from the last RTCP SR and/or RR packet of the VoIP session.

Based on the accumulativeness observation, local packet processors on distributed packet interface cards together with a centralized host processor can be employed to generate remote-reported Session Detail Records (SDRs), at least when a VoIP-to-VoIP call or other VoIP session does not require media transcoding.

For example, during a transcoding-free VoIP-to-VoIP session, both RTP packets and RTCP packets can be directly relayed between gateway interfaces (e.g., from ingress port interface to egress port or interface) at wire-speed without buffering but possibly with header modifications. The local packet processor at each packet interface may cache the latest RTCP SR and/or RTCP RR packets received by the interface.

After a VoIP session terminates, each local packet processor may report the latest RTCP SR or RR packets to a centralized host processor. Of course, due to routing flexibility of IP networks, RTCP packets in a VoIP session may come from one or multiple packet interfaces (cards). The centralized host processor may then check all RTCP report packets received from the packet interfaces, cumulatively, and then select the last RTCP report packet of the VoIP session. Such selection may be based on timestamps, among other determination means. The centralized host processor may then generate a final SDR for the VoIP session.

Referring to FIG. 1, illustrated is a schematic view of at least a portion of one embodiment of an apparatus 100 according to aspects of the present disclosure. The apparatus 100 may be a media gateway, which may be configured to convert data from a format, protocol, and/or type required for one network to another format, protocol, and/or type required for another network. For example, the apparatus 100 may terminate channels from a circuit-switched network and pass streaming media for a packet-switched network, such as RTP streams in an IP network. Input data for the apparatus 100 may include audio, video, and/or T.120 (real-time multi-point communications), among others, which the apparatus 100 may handle simultaneously or otherwise.

As employed herein, a network may refer to an entire network or to a network portion, a network application, and/or network apparatus. To that end, one or more instances of the apparatus 100 may be singularly or collectively employed to bridge two or more networks, including those of PSTNs and VoP networks, among others. PSTN networks may employ TDM, among other non-packet formats and/or protocols. VoP networks may employ ATM, VoIP, VoDSL, other formats and/or protocols, and/or combinations thereof. VoP networks may also employ wireless formats and/or protocols, such as UMTS, CDMA (such as CDMA2000 and/or W-CDMA), and/or combinations thereof, among others.

The apparatus 100 includes a number of packet network interfaces 110. Although only two packet network interfaces 110 are depicted in the illustrated embodiment of FIG. 1, other embodiments within the scope of the present disclosure may include any number of interfaces 110. Each interface 110 is configured to provide an interface between the apparatus 100 and one or more networks 120, where each network 120 may be a packet network (e.g., an IP network), a non-packet network (e.g., a TDM network) or a hybrid of the two. A number of network access devices 130 access the networks 120 for communication therebetween. For example, the network access devices 130 may include, without limitation, wireless phones and other wireless devices, wireline phones and fax machines, etc. Where two network access devices 130 which access different networks 120 establish a communication session, such communication may be via the apparatus 100, as in the embodiment shown in FIG. 1. In the illustrated embodiment, the communication session is a transcoding-free session, such as where each of the devices 130 involved in the session are VoIP-enabled devices, so that the session is a VoIP-to-VoIP session. However, other types and configurations of communication sessions are also within the scope of the present disclosure.

Each of the interfaces 110 includes a cache 140, which may be part of or otherwise associated with a processor associated with each interface 110. The processor may be considered a local processor in the sense that it is part of or otherwise associated with an interface 110. The processor may also be considered a remote processor in the sense that it may be located separate from a host or central processor 160 of the apparatus 100. Nonetheless, in some embodiments, such labels may merely represent logical relationships instead of spatial relationships, because the local or remote processors of the interfaces 110 may physically be part of the same field-programmable gate array (FPGA) or other processing device(s) as the host or central processor 160, distinguishable instead by the software or programming of the processing device(s) rather than their physical location relative to the apparatus 100.

Each cache 140 is configured to store at least the latest RTCP report packet received by the interface 110, whether the RTCP report packet is an SR packet, an RR packet, or otherwise. The cache 140 may be configured to store only one RTCP packet at any time, such as the latest report packet received by the interface. However, in other embodiments, the each cache 140 may be configured to store more than one RTCP report packet. For example, each cache 140 may be configured to store the most recent RTCP RR packet and the most recent RTCP SR packet. However, the scope of the present disclosure does not limit the number of RTCP report packets which can be stored in each cache 140, nor is each cache 140 required to store the same number of RTCP report packets.

Each interface 110 may receive both RTP packets and RTCP packets. For example, flow of RTP packets is indicated in FIG. 1 by a single solid line, whereas flow of RTCP packets is indicated by a dashed line, as represented in the legend also shown in FIG. 1. Thus, each interface 110 may be configured to receive RTP packets from network access devices 130 via a network 120 and subsequently send the RTP packets to a matrix or other switching means 150 of the apparatus 100. Because the RTP packets in the illustrated embodiment correspond to a VoIP-to-VoIP communication session, the RTP packets received by an interface 110 may be sent directly to (and possibly through) the switching means 150 with substantially no encoding. Each interface 110 may also be configured to receive RTP packets from the switching means 150.

RTCP packets received by each interface 110 may similarly be sent to and received from the switching means 150. However, RTCP report packets received by each interface 110 may also be stored in the cache 140 corresponding to the interface 110, as described above. At the conclusion of the communication session, the latest RTCP report packet received/cached by each interface 110 is sent from the caches 140 to the central, host processor 160. These RTCP report packets may be referred to herein as RTCP final report packets, as these report packets are the last packets cached in a communication session by each interface 110 involved in the communication session.

Upon receiving all of the RTCP final report packets from the interfaces 110, the host processor 160 is configured to determine which of the RTCP final report packets is the latest or final packet of the communication session, which may be referred to herein as the RTCP session-concluding report packet. This determination may be made based on timestamp data included in or otherwise associated with each of the RTCP final report packets. Of course, other methods of determining the RTCP session-concluding report packet may also be employed within the scope of the present disclosure. For example, the RTCP final report packet indicating the greatest number of transferred packets may be the RTCP session-concluding report packet, among other determination means.

Upon determination of the RTCP session-concluding report packet, the central, host processor 160 may generate an SDR corresponding to the communication session. Alternatively, or additionally (such as for redundancy or other purposes), an additional component that is integral or external to the apparatus 100 may perform or assist in the determination of the RTCP session-concluding report packet and/or the SDR generation. However, because the SDR is generated based only (or primarily) on the RTCP session-concluding report packet, as opposed to a larger number of RTCP report packets, the efficiency of generating the SDR can be improved, at least in comparison to SDR generation based on more than the RTCP session-concluding report packet.

As indicated by the double solid lines in the illustrated embodiment of FIG. 1, the SDR may then be transmitted to one or more network components other than the apparatus 100. Alternatively, or additionally, the SDR may be employed internally to the apparatus 100, such as to adjust internal parameters or otherwise improve or adjust QoS or other aspects of the apparatus 100.

The switching means 150 may be configured to, among other functions, switch data between the interfaces 110. The data switched by the switching means 150 may be limited to packet data, such as VoIP data, VoDSL data, other VoP data, and/or ATM data, among others. Such packet data may alternatively or additionally include wireless packet data, such as UMTS data, CDMA2000 data, and Iu UP/AAL2 data, among others. However, the switching means 150 may also be configured to switch non-packet data, such as TDM data and/or other PSTN data, among others.

The switching means 150 may be or include one or more switching matrices. For example, in one embodiment, the switching means 150 includes one or more packet data switching matrices, and in another embodiment the switching means 150 also includes one or more non-packet data switching matrices. In one embodiment, the function and/or construction of the switching means 150 may be according to aspects provided in commonly assigned U.S. Provisional Application No. 60/611,221, entitled "MEDIA GATEWAY FOR MULTIPLE WIRELINE AND WIRELESS FORMATS, COMPONENTS THEREOF, AND PROCESSES PERFORMED THEREIN," filed on Sep. 18, 2004, which is hereby incorporated by reference herein, in its entirety.

Figure 2:
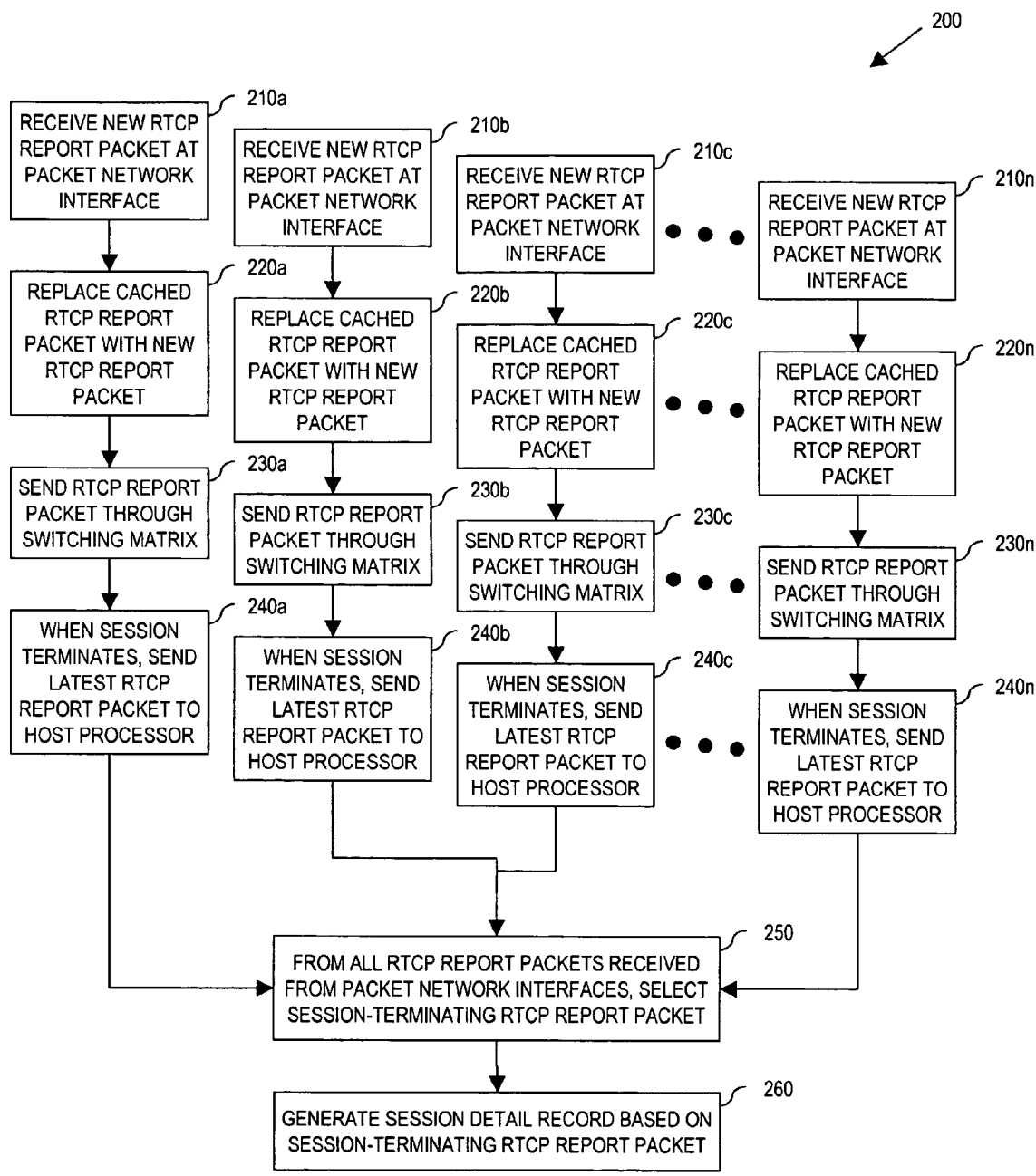
FIG. 2 is a flow-chart diagram of at least a portion of one embodiment of a method according to aspects of the present disclosure.

Referring to FIG. 2, illustrated is a flow-chart diagram of at least a portion of one embodiment of a method 200 according to aspects of the present disclosure. The method 200 includes steps 210a-n (where "n" is a variable integer) during which an RTCP report packet is received by each of "n" number of interfaces involved in a communication session. Each of the "n" interfaces may be substantially similar to the interfaces 110 shown and described in reference to FIG. 1. The communication session may be a VoIP-to-VoIP or other transcoding-free session in which the session origin and destination (e.g., the calling device and the called device) are enabled and operating under the same protocol (e.g., VoIP, among others).

During steps 220a-n, each of the RTCP report packets received during steps 210a-n may replace a currently cached RTCP report packet in each respective interface, which may include discarding the currently cached RTCP report packet. Alternatively, where the caches associated with one or more of the "n" interfaces is configured to store more than one RTCP report packet, the RTCP report packets received during steps 210a-n may be added to the cache and the oldest RTCP report packet currently in each cache may be discarded. Thus, the caches may be first-in-first-out caches.

During steps 230a-n, the RTCP report packets received during steps 210a-n may also be sent to (and possibly through) a switching means, such as the switching means described elsewhere herein. In one embodiment, one or more of the steps 220a-n is performed substantially simultaneously with the corresponding one of the steps 230a-n (e.g., step 220b may be performed substantially simultaneously with step 230b). However, one or more of the steps 230a-n may also or alternatively be performed prior to the corresponding one of the steps 230a-n (e.g., step 230c may be performed before step 220c). Moreover, in one embodiment, one or more of the steps 230a-n may be optional, such that the RTCP report packets may not be sent until the end of the communication session. One embodiment may also include polling for the RTCP report packets, such as by a central or host processor, in contrast to or in addition to the automatic and/or periodic transmission envisioned by steps 230a-n.

As the communication session terminates, or nears termination, the RTCP report packet that is most-recently cached by each of the interfaces is sent to a central or host processor during steps 240a-n. Such transfer may also or alternatively not occur until termination of the communication session is confirmed. Thereafter, during step 250, these final RTCP report packets communicated to the central processor are examined to determine which was generated most closely to the termination of the communication session, in a temporal sense. Thus, the last RTCP report packet of the communication session is determined during step 250, and subsequently employed during step 260 to generate a session detail record corresponding to the communication session.

Thus, one embodiment of a method according to aspects of the present disclosure includes, at least in part, caching each of a plurality of realtime transport control protocol (RTCP) reports in one of a plurality of caches each associated with one of a plurality of voice-over-internet-protocol (VoIP) network interfaces collectively employed for a VoIP session to which each of the plurality of RTCP reports corresponds, the caching including replacing any previously cached one of the plurality of RTCP reports with a most recently received one of the plurality of RTCP reports. One of the cached ones of the plurality of RTCP reports is determined to be a session-concluding RTCP report corresponding to termination of the VoIP session, and a final session detail record corresponding to the VoIP session and based on the session-concluding RTCP report is generated.

Another embodiment of a method according to aspects of the present disclosure includes, at least in part, receiving a first one of a plurality of RTCP reports at a first one of a plurality of VoIP network interfaces, wherein each of the plurality of RTCP reports corresponds to a particular VoIP session employing each of the plurality of VoIP network interfaces, and wherein each of the plurality of RTCP reports includes at least one of an RTCP receiver report and an RTCP sender report. The first one of the plurality of RTCP reports is stored in a first cache associated with the first one of the plurality of VoIP network interfaces. The method also includes receiving a second one of the plurality of RTCP reports at a second one of the plurality of VoIP network interfaces. The second one of the plurality of RTCP reports is stored in a second cache associated with the second one of the plurality of VoIP network interfaces. The method also includes receiving a third one of the plurality of RTCP reports at the first one of the plurality of VoIP network interfaces, and replacing the first one of the plurality of RTCP reports in the first cache with the third one of the plurality of RTCP reports. A fourth one of the plurality of RTCP reports is received at the second one of the plurality of VoIP network interfaces. The second one of the plurality of RTCP reports is replaced in the second cache with the fourth one of the plurality of RTCP reports. The method also includes determining which one of the cached ones of the plurality of RTCP reports is a session-concluding RTCP report corresponding to termination of the particular VoIP session, and generating a final session detail record corresponding to the particular VoIP session and based on the session-concluding RTCP report.

Figure 3:
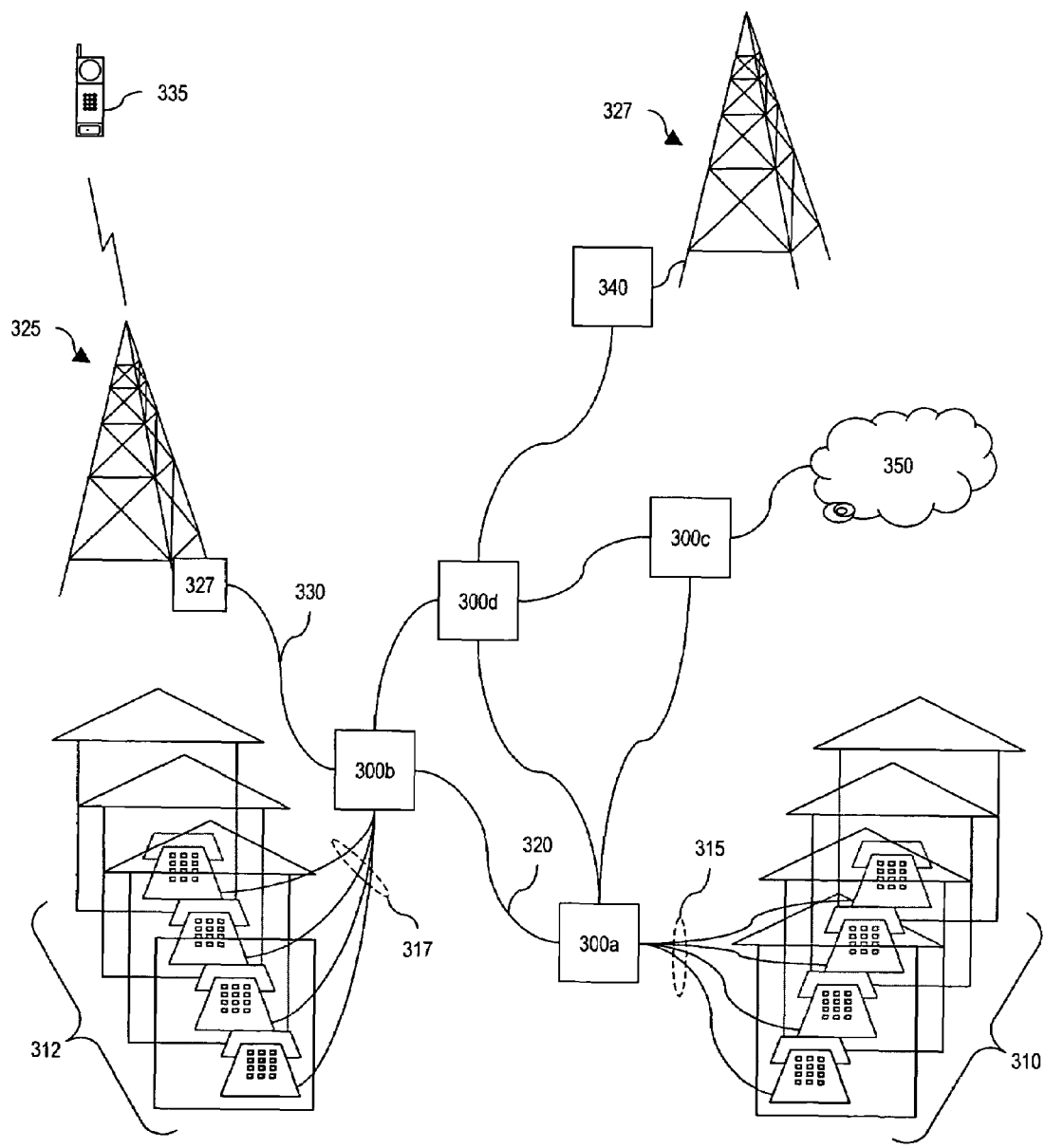
FIG. 3 is a schematic view of at least a portion of embodiments of a network and network apparatus according to aspects of the present disclosure.

Referring to FIG. 3, illustrated is a schematic diagram of at least a portion of one embodiment of a network 300 according to aspects of the present disclosure. The network 300 may include several networks and/or portions thereof. The network 300, or portions thereof, is one environment in which the above-described apparatus 100 may be implemented according to aspects of the present disclosure. For example, the network 300 includes apparatus 300a-d, each of which may be substantially similar to the apparatus 100. The apparatus 300a-d are each configured according to their particular role in the network 300, including the configuration of the number and type of interfaces, for example.

The apparatus 300a is connected by a plurality of loops 315 to one or more PSTN access networks 310 that may include a plurality of residential telephones and/or business exchanges (PBX). In one embodiment, the telephones may be grouped by digital loop carriers and/or other aggregators which, possibly in addition to one or more PBX, may be included in one or more of the PSTN access networks 310, or may otherwise be configured to communicate with the apparatus 300a through a PSTN network 310. The loops 315 may include digital loops and/or analog loops, and may be configured to transmit TDM and other PSTN data, VoIP data, DSL data, VoDSL data, and/or ATM data, among others. Thus, the apparatus 300a may be, or may be employed as, a central office switch, or a Class 5 switch. Accordingly, any PSTN access network 310 connected to the apparatus 300a may communicate with another PSTN access network 310 connected to the apparatus 300a.

The apparatus 300a is also connected to the apparatus 300b by a trunk or other transmission line 320. The apparatus 300b is, in turn, connected to a plurality of residential telephones, business PBXs, digital loop carriers, and/or PSTN access networks (hereafter collectively referred to as PSTN access networks, although merely for the sake of simplicity) 312 by a corresponding plurality of loops 317, which may each be substantially similar to one or more of the loops 315. Thus, any of the PSTN access networks 310 may communicate with any of the PSTN access networks 312 via the apparatus 300a and 300b, the trunk 320, and corresponding ones of the loops 315, 317.

The apparatus 300b is also connected to a tower 325 or tower controller 327 by one or more copper and/or fiber cables 330. The tower 325 may be a base station (e.g., in a 2G wireless network) and/or a radio network station (e.g., an RNS in a radio access network (RAN) or 3G wireless network). The tower controller 327 may be a base station controller (e.g., a BSC in a 2G wireless network) and/or a radio network controller (e.g., an RNC in an RAN or 3G wireless network), at least in part. Consequently, any PSTN access network 312 may communicate with a wireless phone 335 (e.g., a cellular or radio phone) within range of the tower 325 via the apparatus 300b, a corresponding one of the loops 317, the cable 330, the tower controller 327, the tower 325, and a wireless/radio signal between the tower and wireless phone 335

The apparatus 300d is also configured to support wireless communications, and may otherwise be substantially similar to the apparatus 300b (and/or the apparatus 300a) except that the apparatus 300d is not connected to any PSTN access networks. Nonetheless, a PSTN access network (e.g., network 310 and/or network 312) may still communicate with the apparatus 300d, although such communications may first be transmitted through the apparatus 300a and/or the apparatus 300b. Consequently, the apparatus 300d may still cooperate with a wireless portion of the network 300.

A PSTN access network 310 may also allow communication between other telephones (wireless or otherwise) via connection through an additional switch and/or network. For example, the apparatus 300c is connected to the apparatus 300a and 300d or similar apparatus. In one embodiment, the apparatus 300c is a tandem switch or gateway, such as may be connected to another network 350, which may be or include an IP, ATM or other packet-based network and/or a PSTN or other non-packet based network. Thus, in some embodiments, the apparatus 300c and/or 300d are primarily connected to switching apparatus and other network components configured to perform switching functions. In one embodiment, the apparatus 300c and 300d are each connected only to instances of the apparatus 300a-d. Thus, the apparatus 300c and/or 300d may each be, or may each be employed as, an interoffice switch ("tandem"), or a Class 4 switch, primarily passing voice and other data transmissions between other switches. In any of such intermediary roles, the apparatus 300c may be configured to not include interfaces with transmission links that are directly connected to a PSTN access network. For example, the apparatus 300c may be configured to only include interfaces with other ones of the apparatus 300a-d.

In view of all of the above, it should be understood that the present disclosure introduces an apparatus that includes a plurality of packet processors each included in one of a plurality of voice-over-internet-protocol (VoIP) network interfaces, wherein each of the plurality of packet processors is configured to cache a latest version of realtime transport control protocol (RTCP) report data by discarding an older version of the RTCP report data, wherein the RTCP report data includes RTCP sender report data and/or RTCP receiver report data. A packet data switching matrix of the apparatus is configured to switch packet data between ones of the plurality of VoIP network interfaces. A central processor of the apparatus is configured to generate a final session detail record upon the termination of a VoIP session by selecting RTCP session-concluding report data from a plurality of RTCP final report data each cached by a corresponding one of the plurality of packet processors.

The present disclosure thus introduces scalable and efficient methods and systems that use local packet processors on distributed packet interface cards together with a centralized host processor to generate remote-reported Session Detail Records (SDR) when a VoIP-to-VoIP or other communication session does not require media transcoding. Consequently, at least in some embodiments, the distributed local packet processors on each interface may perform a simple operation at wire speed: caching RTCP SR and RR packets. Scalability and efficiency may be provided in some embodiments, including some embodiments in which only the finally cached RTCP report packets may be sent to the centralized host processor for one-time summarization to generate remote-reported Session Detail Records. Consequently, some embodiments may exhibit a decreased demand for communication bandwidth, message buffers, and processing power.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
a plurality of packet processors each included in one of a plurality of voice-over-internet-protocol (VoIP) network interfaces, wherein each of the plurality of packet processors is configured to cache a latest version of realtime transport control protocol (RTCP) report data by discarding an older version of the RTCP report data, wherein the RTCP report data includes at least one of RTCP sender report data and RTCP receiver report data;
a switching matrix configured to switch packet data between ones of the plurality of VoIP network interfaces; and
a central processor configured to generate a final session detail record upon the termination of a VoIP session by selecting RTCP session-concluding report data from a plurality of RTCP final report data each cached by a corresponding one of the plurality of packet processors.

2. The apparatus of claim 1 wherein the session-concluding RTCP data employed by the central processor to generate the final session detail record corresponds to final RTCP report data cached by only one of the plurality of packet processors.

3. The apparatus of claim 1 wherein the RTCP report data cached by each of the plurality of packet processors is limited to substantially non-transcoded VoIP sessions having substantially similar origin and destination media encoding.

4. The apparatus of claim 1 wherein the RTCP report data is accumulative.

5. The apparatus of claim 1 wherein each newly-cached RTCP report data is inclusive of discarded RTCP report data.

6. The apparatus of claim 1 wherein at least one of the plurality of VoIP network interfaces is configured to modify at least one outer layer of an RTCP data packet.

7. The apparatus of claim 1 wherein at least one of the plurality of VoIP network interfaces is configured to modify at least one of a source IP address and a destination IP address of an RTCP data packet.

8. The apparatus of claim 1 wherein at least one of the plurality of VoIP network interfaces is configured to modify a user datagram protocol (UDP) port of an RTCP data packet.

9. The apparatus of claim 1 wherein at least one of the plurality of VoIP network interfaces is configured to modify at least one of a source IP address and a destination IP address of a realtime transport protocol (RTP) data packet associated with corresponding RTCP report data.

10. The apparatus of claim 1 wherein at least one of the plurality of VoIP network interfaces is configured to modify a user datagram protocol (UDP) port of a realtime transport protocol (RTP) data packet associated with corresponding RTCP report data.

11. The apparatus of claim 1 wherein the plurality of packet processors is collectively configured to cache at least one version of RTCP report data about every ten seconds.

12. The apparatus of claim 1 wherein the plurality of packet processors is collectively configured to cache at least one version of RTCP report data at periodic, configurable time intervals.

13. The apparatus of claim 1 wherein the apparatus forms at least a portion of a media gateway.

14. The apparatus of claim 1 wherein the apparatus forms at least a portion of a media gateway configured to switch data between wireless and wireline networks.

15. A method, comprising:
receiving, at a first one of a plurality of VoIP network interfaces, a first one of a plurality of RTCP reports each corresponding to a particular VoIP session employing each of the plurality of VoIP network interfaces, wherein each of the plurality of RTCP reports includes at least one of an RTCP receiver report and an RTCP sender report;
storing the first one of the plurality of RTCP reports in a first cache associated with the first one of the plurality of VoIP network interfaces;
receiving, at a second one of the plurality of VoIP network interfaces, a second one of the plurality of RTCP reports;

storing the second one of the plurality of RTCP reports in a second cache associated with the second one of the plurality of VoIP network interfaces;

receiving, at the first one of the plurality of VoIP network interfaces, a third one of the plurality of RTCP reports;

replacing the first one of the plurality of RTCP reports in the first cache with the third one of the plurality of RTCP reports;

receiving, at the second one of the plurality of VoIP network interfaces, a fourth one of the plurality of RTCP reports;

replacing the second one of the plurality of RTCP reports in the second cache with the fourth one of the plurality of RTCP reports;

determining which one of the cached ones of the plurality of RTCP reports is a session-concluding RTCP report corresponding to termination of the particular VoIP session; and generating a final session detail record corresponding to the particular VoIP session and based on the session-concluding RTCP report.

16. The method of claim 15 wherein each of the first and second caches are configured to store no more than one of the plurality of RTCP reports at any time.

17. The method of claim 15 wherein at least one of the plurality of RTCP reports is stored in one of a plurality of caches at periodic and configurable time intervals, wherein the plurality of caches includes the first and second caches.

18. A method, comprising:

caching each of a plurality of realtime transport control protocol (RTCP) reports in one of a plurality of caches each associated with one of a plurality of voice-over-internet-protocol (VoIP) network interfaces collectively employed for a VoIP session to which each of the plurality of RTCP reports corresponds, the caching including replacing any previously cached one of the plurality of RTCP reports with a most recently received one of the plurality of RTCP reports;

determining which one of the cached ones of the plurality of RTCP reports is a session-concluding RTCP report corresponding to termination of the VoIP session; and generating a final session detail record corresponding to the VoIP session and based on the session-concluding RTCP report.

19. The method of claim 18 wherein each of the plurality of caches is configured to store no more than one of the plurality of RTCP reports at any time.

20. The method of claim 18 wherein caching each of the plurality of RTCP reports in one of the plurality of caches includes caching at least one of the plurality of RTCP reports at periodic, configurable time intervals.

* * * * *